Patented May 27, 1947

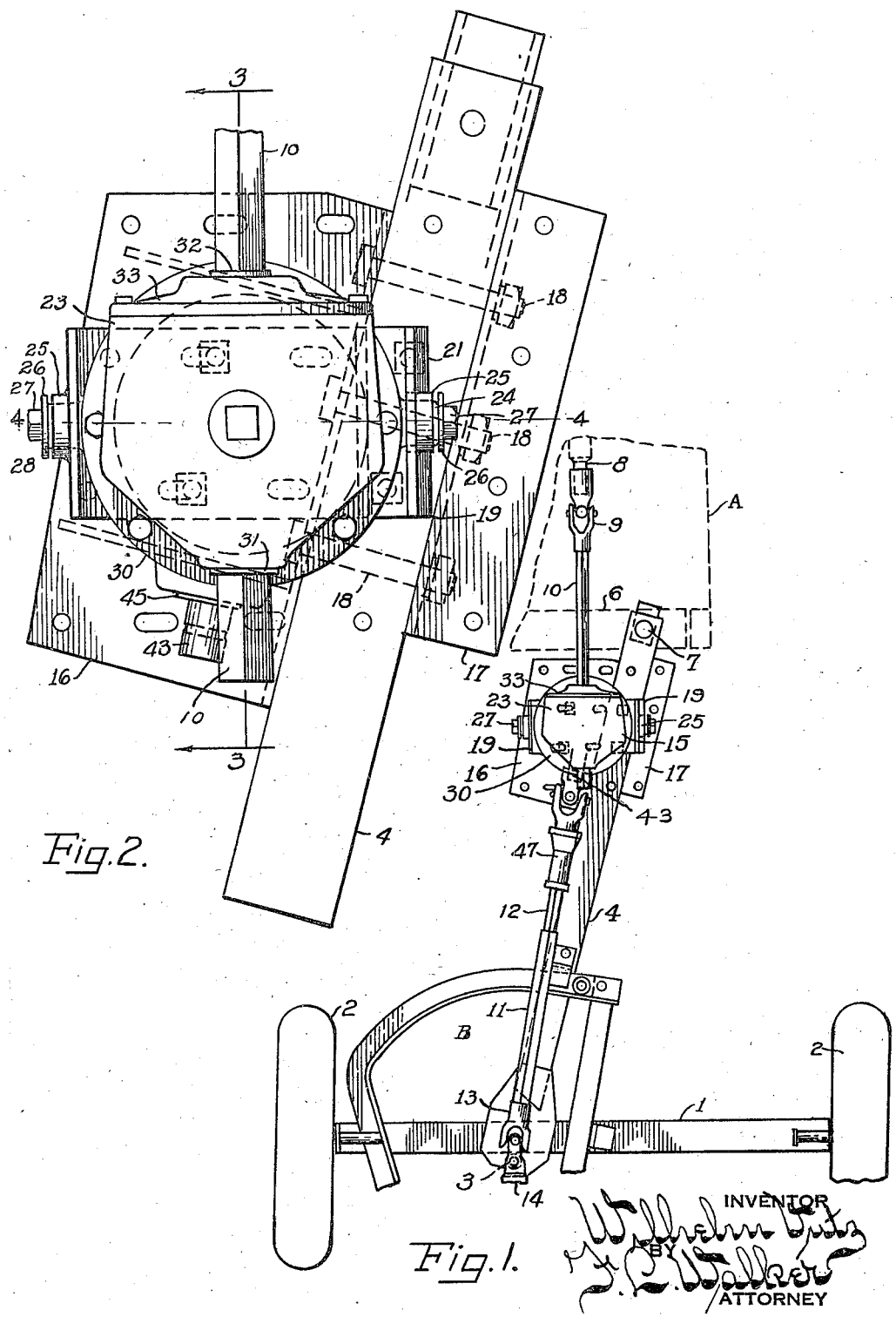

2,421,044

UNITED STATES PATENT OFFICE 2,421,044

POWER TRANSMISSION MECHANISM

Wilhelm Vutz, Coldwater, Ohio, assignor, by mesne assignments, to Avco Manufacturing Corporation, a corporation of Delaware Application July 23, 1943, Serial No. 495,855

20 Claims. (Cl. 180—14)

This invention pertains to flexible power transmission mechanism for operatively interconnecting misaligned relatively movable driving and driven members, and more particularly to universally adjustable driving connections which will automatically compensate for fluctuating degrees of unalignment of flexibly coupled tractor and trailing land vehicles during transmission of power from one to the other while traversing an ununiform or meandering course over uneven ground, and while making right and left turns.

In the operation of tractor drawn farm implements, such as planters, cultivators, harvesters, mowers and the like, the drawing and trailing vehicles are subject to both vertical and lateral displacement one relative to the other out of direct line of travel and turns on relatively short radii, some of which approximate right angle to the preceding direction of travel are more or less frequent. However, regardless of the changing relation of the drawing and drawn vehicles substantially uniform delivery of power requirement in the different positions of the units is highly desirable.

While the present power drive connection is especially desirable for tractor drawn agricultural implements, it is also applicable to a wide variety of remotely operated mechanism of other character having changing relations, and is therefore not limited to farm equipment in its scope or application. The usual type of power drive connections heretofore available do not possess the requisite flexibility or range of adjustment necessary for modern practice, and require use of special hitches, supplemental power take-off shafts, and manual adjustments, the functions of which are obviated by the hereindescribed construction.

The object of the invention is to improve the construction as well as the means and mode of operation of automatically adjustable power drive devices or power take-offs for trailer vehicles, whereby they may not only be economically manufactured and installed, but will be more efficient in use, automatic in operation, uniform in action, having relatively few operating parts, and be unlikely to get out of repair.

A further object of the invention is to provide a geared type of flexible compensating power drive mechanism which will readily accommodate itself to a relatively wide range of lateral unalignment of the driving and driven units without interfering with their operation, and without the use of special hitches and adjustments.

A further object of the invention is to provide a flexible drive mechanism which will automatically compensate for deviation of one unit or the other from a straight path, and for turns of different radii, including approximately right angle turns and which will maintain substantially uniform power delivery throughout such changes of direction of travel.

A further object of the invention is to increase the operating range of such power transmission mechanism and minimize the resistance thereof to change of direction of travel of either the tractor or trailing unit.

A further object of the invention is to provide an automatically compensating power take-off device for operatively connecting tractor and trailing implements or vehicles, having the advantageous structural features and inherent meritorious characteristics with the mode of operation herein set forth.

With the above primary and other incidental objects in view as will more fully appear in the specification, the invention intended to be protected by Letters Patent consists of the features of construction, the parts and combinations thereof and the mode of operation, or their equivalents, as hereinafter described or illustrated in the accompanying drawings.

In the drawings, wherein is illustrated the preferred but obviously not necessarily the only form of embodiment of the invention, Fig. 1 is a plan view of fragmentary portions of a tractor and a trailing unit interconnected by a flexible automatically compensating power drive mechanism embodying the present invention.

Fig. 2 is an enlarged plan view of the geared transmission unit by which the driving and driven portions of the present assembly are interconnected for unison operation in various positions of angular adjustment.

Like parts are indicated by similar characters of reference throughout the several views.

Figure 3:
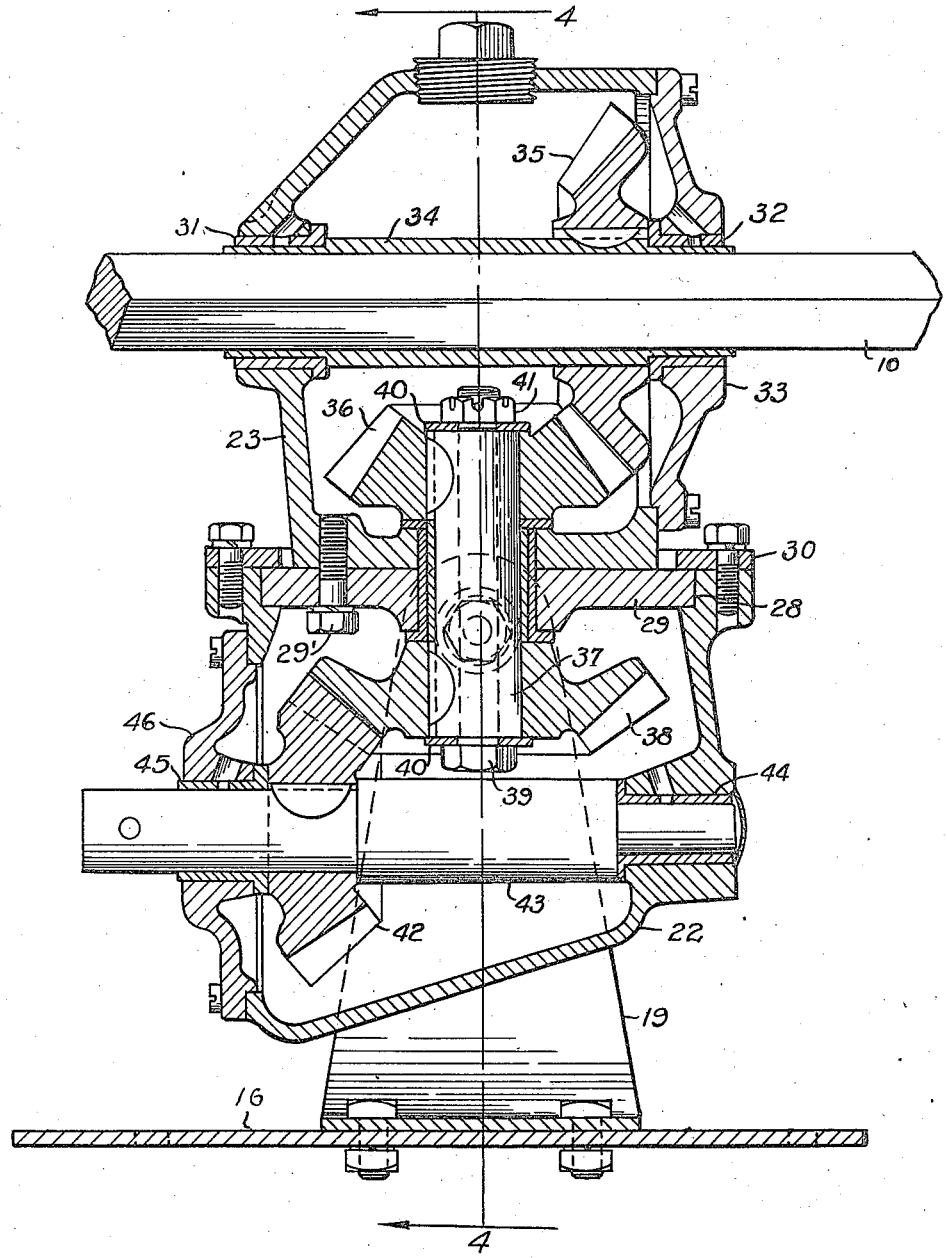
Fig. 3 is a vertical sectional view of the geared unit in a plane common to the driving and driven shafts of the assembly on line 3—3 of Fig. 2.

In tractor drawn agricultural assemblies, such as mowers, harvesters, potato diggers, or cultivators, it is frequently desirable that the drawn implement be laterally offset relative to the path of travel of the lead unit so that the drawn implement may follow a row of growing plants while the tractor or draft appliance will miss or straddle such row. Such relation of the leading and trailing units involves some difficulties when making turns of relatively short radii. Universal joints and telescopic shaft members afford quite satisfactory and serviceable drive connections for ordinary usage and for some special circumstances when the maximum angularity or offset of the tandem units is not excessive. However, when power is transmitted through a series of angularly disposed shafts interconnected by universal joints, more or less "knocking" occurs due to necessary looseness of the joints and clearances to enable proper lubrication. Moreover, such universally jointed assemblies are subject to excessive wear and in time become loose and possess excessive lost motion, which increases the tendency of the parts to "knock."

When operated at an extreme angle, as is necessary in making short turns of driving and driven units, such universal joints do not transmit rotation uniformly. Even though the rotation of the primary drive shaft is constant, the velocity of succeeding shaft section of a universally connected series are not uniform therewith. Consequently, considerable torsional stress and vibration occurs. The fact that farm implements, road building equipment and the like must be laterally offset relative to the tractor from which motive power is derived, greatly aggravates these difficulties, and the ability to transmit rotational motion while making turns is greatly reduced.

The hereinafter described intermediate geared unit, comprising relatively rotatable upper and lower sections which are capable of unison tipping motion while maintaining uniform operation of a train of intermeshing gears, minimizes the aforementioned difficulties. The geared coupling unit in the power line is mounted relatively closely to the driving member, which minimizes the angularity imposed upon the initial joint between the tractor power shaft and the initial section of the transmission assembly.

In the drawings there are shown a tractor or draft unit A, to which is flexibly coupled for unison travel movement a trailer unit B, which may be an agricultural implement, or a drawn vehicle of whatever character bearing mechanism to be actuated. The fragmentary portion of the trailer unit B herein shown comprises an axle 1, upon which are mounted carrying wheels 2, and to which is pivoted at 3 a draft tongue 4, supported by an arcuate frame portion 5 of the trailer unit for to and fro oscillatory motion about its pivot 3. At its forward end the draft tongue 4 is flexibly coupled to the draw bar 6 of the tractor or draft unit by a detachable coupling pin 7. Upon the trailer unit B may be mounted any desired type of power driven mechanism, to be actuated by power derived from the drive motor of the tractor or draft unit A.

Figure 4:
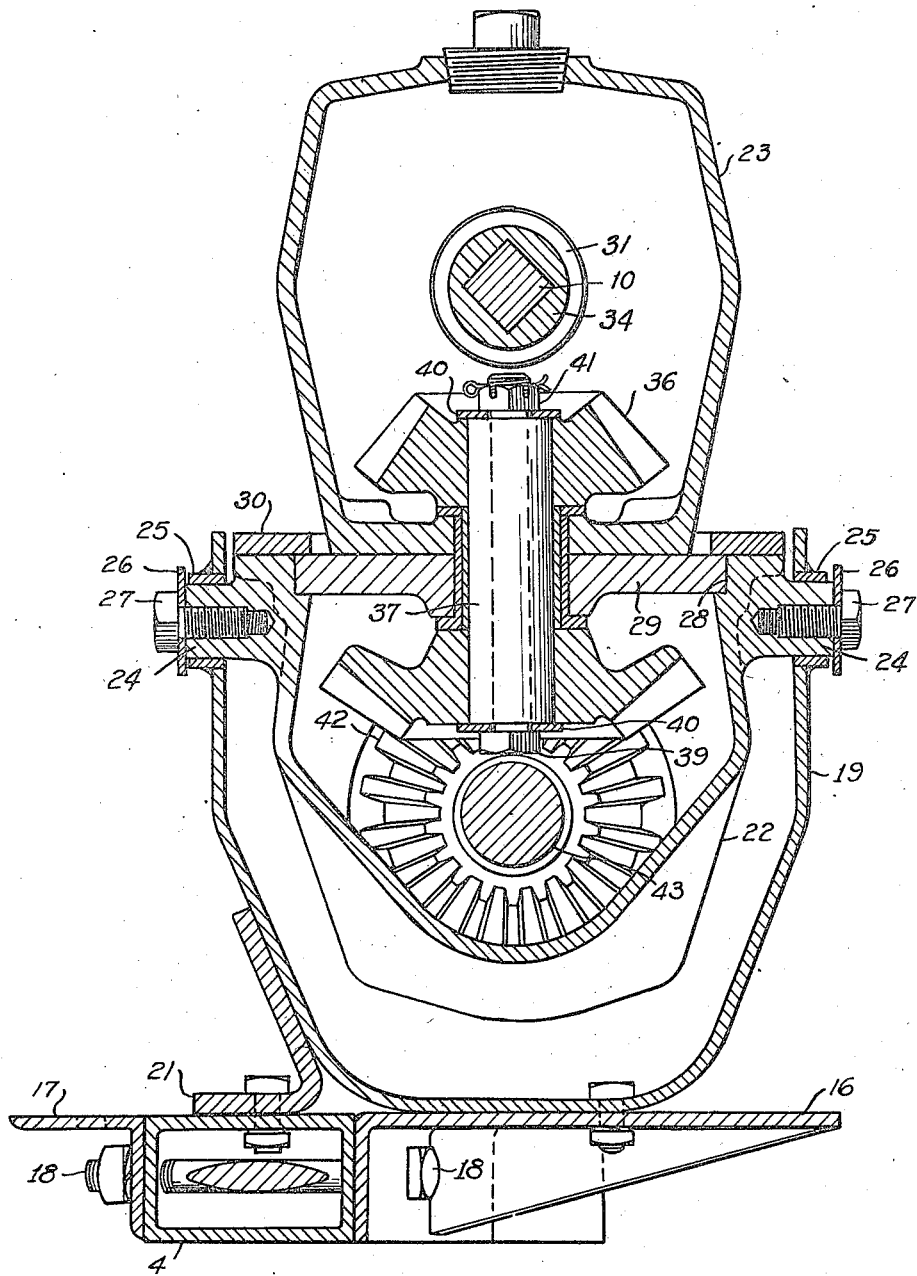
Fig. 4 is a vertical sectional view of the geared unit on line 4—4 of Fig. 2 and of Fig. 3.

The intermediate power transmission flexibly connecting the power delivery shaft of the tractor and the driven mechanism upon the trailer and forming the subject matter of the present invention, includes series connected, revoluble and telescopic shaft sections coupled by an intermediate geared unit having a gimbal type mounting for flexing movement or oscillation in various directions while maintaining constant uniform drive connection between the shaft sections, which are further longitudinally adjustable relative to such geared unit. Such swivel gear head coupling is illustrated in plan view in Fig. 2 and transverse vertical sectional views thereof appear in Figs. 3 and 4.

As shown in Fig. 1, the power shaft 8 of the tractor A or other draft unit is connected by a universal coupling 9 to a rigid rotary polygonal shaft 10 which extends rearwardly toward the drawn unit or vehicle B. A telescopic power shaft section comprising a tubular member 11 and a polygonal member 12 sliding therein, is connected by a universal joint 13 with the driven member 14 of the mechanism mounted on the trailer unit. It is obvious that during travel motion over uneven ground and also by lateral deviations from a straight line of travel, the power shaft will be subject to varying degree of extension and retraction and to and fro flexing influences additionally to its rotary motion, which movements will be greatly increased when turning to the right or left.

In the present instance, these adjustments are automatically compensated for by the gear head coupling unit 15 which is mounted on the draft tongue 4 and on a laterally extending flange 16 bolted to one side of the draft tongue. A further flange or extension 17 is secured to the opposite side of the tongue 4 by the same bolts 18 which attach the flange or extension 17.

The gear head unit is mounted for to and fro swinging motion in a U shaped bracket 19, the base of which rests upon and is bolted to the draft tongue extension 16. The bracket 19 is provided with a welded foot 21 bolted to the top of the draft tongue 4. The gear unit 15 includes two rotatively interconnected housings 22 and 23. The lower housing 22 is provided with lateral trunnions 24 journaled in bearings 25 in the upper ends of the U shaped bracket 19. The trunnions 24 are secured against disengagement from the bearings by marginally overlapping washers 26 secured to the ends of the trunnions by screw studs 27. The top of the housing portion 22 is provided with an annular rabbeted bearing 28 in which is mounted a revoluble base plate 29, to which the upper gear housing 23 is fixedly secured by welding or by being bolted thereto, as by the screw studs 29'. The gear housings 22 and 23 are retained in relative rotative engagement by a collar 30 secured to the top of the lower housing 22 in overlapping relation with the margin of the revoluble base plate 29. The construction is such that the gear housing 23 is free for unrestricted rotation about a vertical axis relative to the lower gear housing 22, except as limited by the reciprocatory engagement of the shaft section 10, as hereafter described. The interconnected gear housings are further capable of conjoint oscillation about the transverse axis of the trunnions 24. The upper gear housing 23 is provided with suitably bushed oppositely disposed aligned bearings 31 and 32. One such bearing is in an integral side wall of the housing, while the other bearing is in a removable side wall or cap 33, the removal of which affords access to the interior of the gear housing 23. In these bearings is revolubly mounted a hollow shaft or sleeve 34 having therein a polygonal axial passage through which the initial drive shaft section 10 extends for free to and fro reciprocatory motion relative to the gear housing. The sleeve 34 rotates in the bearings 31 and 32 in unison with the rotation of the shaft 10, but the latter is capable of independent longitudinal movement within the hollow shaft or sleeve 34. Keyed to the revoluble shaft or sleeve 34 for unison rotation is a beveled gear 35. The beveled gear 35 meshes with a corresponding beveled gear pinion 36, fast upon a short, revoluble shaft 37, mounted in a bushed bearing in the bottom of the housing 23 and the attached base plate 29 in concentric relation with the annular bearing 28. The shaft 37 projects into each of the relatively adjustable gear housings 22 and 23, coincident with their axis of relative rotation. The lower end of the shaft 37 within the lower gear-housing 22 carries a second beveled gear wheel 38 keyed or otherwise secured thereto for unison rotation. The beveled gears 36 and 38 are securely held against detachment from the shaft 37 by a bolt 39 extending through an axial bore in the shaft 37 and carrying washers 40 at each end thereof which overlap the hubs of the beveled gears 36 and 38 and are held in position by a locked nut 41 on the upper end of the bolt. The beveled gear 38 in the lower gear housing 22 meshes with a corresponding gear pinion 42 mounted on a stub shaft 43, the opposite ends of which are journaled in suitably bushed bearings 44 and 45 in opposite sides of the gear housing 22. One such bearing is in an integral side wall of the housing, while the other is in a removable cover or cap 46, the detachment of which affords access to the interior of the housing 22 for examination and replacement of the gears. The relation of the intermeshing gears of the gear train illustrated is such that the stub shaft 43 and the telescopic shaft section 11—12 connected to the stub shaft 43 by a universal joint 47 are rotated at a greater speed than the initial driving shaft section 10. The speed ratio of the driving and driven sections of the power transmission assembly can be varied by transposition of the beveled gears shown or by substitution of other gears of different sizes therefor. The general arrangement is such that as the levels of the tractor and drawn units rise and fall while traversing uneven or rolling ground, the gear unit will compensate by swinging on the substantially horizontal axis of the trunnions 24, while lateral deviation of the respective units from a straight path of travel will be compensated by relative rotation of the upper and lower gear housings which permits angular adjustment of the power shaft sections 10 and 11—12 to varying degree. Such fluctuating degrees of unalignment vertically and horizontally necessitates variable extension and retraction of the power transmission assembly, which is automatically accommodated by to and fro reciprocatory motion of the initial power shaft section 10 within the hollow shaft or sleeve 34 and by extension and contraction of the telescopic shaft section 11—12. This necessary extension and contraction of the power shaft is greatly increased under extreme unalignment of the tractor and trailer units when making right or left turns, but is equally easily and proportionately accommodated by the respective telescopic adjustments of the shaft section 10 within the shaft 34 and the telescopic adjustment of the shaft section 11—12. These telescopic adjustments further enable ready application of the power transmission mechanism to other draft and drawn units of different design which may be spaced greater or less distances apart, without interfering with the flexibility or freedom of action of the power drive connections. While for convenience of illustration, but with no intent to so limit the invention, the coupling unit has been shown mounted upon the draft tongue of the trailer unit intermediate the driving and driven mechanism. It might be made a component part of either the driving or the driven mechanism or mounted elsewhere upon either the tractor or trailer unit, or upon a bracket or extension thereof other than the interconnecting draft tongue.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A power transmission assembly interconnecting a drive mechanism on a tractor unit with a driven mechanism upon a trailer unit which is flexibly connected to the tractor for unison advancement in varying degrees of relative unalignment while following an undulating path of travel, including right and left turns over uneven terrain, including a rigid rotary power shaft flexibly connected to one said mechanism, a telescopic power shaft flexibly connected to the other said mechanism, a coupling unit including two relatively rotatable housings interpivoted one to the other, with one of which one section of the telescopic shaft has rotary but non-reciprocatory connection, and with the other of which rotatable interpivoted housings the rigid rotary power shaft has axial reciprocatory engagement, a mounting carried by one of the interconnected units in which the interpivoted housings are mounted for unison rocking motion about an intermediate axis transversely disposed to the interpivotal axis of the housings, and a gear train including gears on the respective power shafts within the housings with which the respective shafts are connected and intermediate gears and connections for transmitting unison motion from the gear upon one shaft in one of the housings to the gear on the other shaft in the other housing in various positions of relative rotary and unison swinging adjustments of the housings of the coupling unit.

2. A power transmission assembly interconnecting a drive mechanism on a tractor unit with a driven mechanism upon a trailer unit which is flexibly connected to the tractor for unison advancement in varying degrees of relative unalignment while following an undulating path of travel, including right and left turns over uneven terrain, driving and driven rotary power shafts flexibly connected respectively with the driving and driven mechanisms, a coupling unit therefor carried by one of the units and disposed in spaced relation with both the driving and driven mechanisms relative to which coupling unit at least one of the power shafts is capable of axial reciprocatory motion, and a gear train interconnecting the driving and driven shafts within the coupling unit maintaining unison rotation thereof while enabling relative adjustment of the shafts into various angular relations of one to the other.

3. A power transmission assembly interconnecting a drive mechanism on a tractor unit with a driven mechanism upon a trailer unit which is flexibly connected to the tractor for unison advancement in varying degrees of relative unalignment while following an undulating path of travel, including right and left turns over uneven terrain, driving and driven rotary power shafts flexibly connected to the driving and driven mechanism, a geared coupling unit therefor carried by one of the units comprising a pair of relatively revoluble housings, a rotary shaft about the axis of which the housings are relatively revoluble and having its ends projecting into the said housings, a rotary sleeve journaled in one of the housings through which one of the power shafts projects for relative axially reciprocatory but unison rotary motion, a drive gear carried by said sleeve, a mating gear upon the rotary shaft of the housings with which the driving gear on the rotary sleeve intermeshes, a second gear within the other of said housings on said rotary shaft, a rotary shaft fixedly journaled in the other housing and a driven gear in said other housing connected with the driven shaft, and with which the second gear on the rotary shaft intermeshes.

4. A power transmission assembly interconnecting a drive shaft on a tractor unit with a driven shaft upon a trailer unit which is flexibly connected to the tractor for unison advancement in varying degrees of relative unalignment while following an undulating path of travel, including right and left turns over uneven terrain, comprising a pair of concentrically disposed relatively rotatable housings, a rotary shaft common thereto extending into the respective housings, a pair of gears carried by the rotary shaft, one in each housing, a drive shaft slidingly journaled in one of the housings, a driving gear carried thereby intermeshing with one of the gears upon the common rotary shaft within the corresponding housing, a driven shaft journaled in the other of said housings, a driven gear carried thereby intermeshing with the other of the gears upon the common rotary shaft within the corresponding housing, a pivotal mounting common to the housings upon which the housings are capable of unison oscillation about an axis perpendicular to that upon which they are relatively rotatable, the construction and arrangement being such that the driving and driven shafts are adjustable both longitudinally and angularly one relative to the other in parallel planes and further capable of unison oscillation about a transverse common axis while maintaining constant intermeshing engagement with the gears upon the rotary shaft common to the housings.

5. A power transmission assembly interconnecting a drive mechanism on a tractor unit with a driven mechanism upon a trailer unit which is flexibly connected to the tractor for unison advancement in varying degrees of relative unalignment while following an undulating path of travel, including right and left turns over uneven terrain, relatively adjustable driving and driven shafts interconnected with the corresponding driving and driven mechanisms, a universal geared interconnection between the driving and driven members, including driving and driven gears connected with the respective shafts for unison rotation, relative to at least one of which the corresponding shaft is capable of to and fro reciprocatory motion, intermediate gears connecting the driving and driven gears for unison rotation in any one of several radial positions to which one of said gears may be moved by relative angular adjustment of the shafts one in relation with the other, and a pivotal support for the gear train carried by one of the units upon which the gear assembly is capable of bodily rocking motion incident to unison oscillation of the shafts.

6. A power transmission assembly interconnecting a drive mechanism on a tractor unit with a driven mechanism upon a trailer unit which is flexibly connected to the tractor for unison advancement in varying degrees of relative unalignment while following an undulating path of travel, including right and left turns over uneven terrain, driving and driven revoluble shafts disposed in relatively offset, substantially parallel planes and flexibly connected with the driving and driven mechanisms, an intermediate rotary shaft with which the relatively offset shafts are interconnected for oscillatory movement to different radial positions of at least one of the shafts about said rotary shaft as a center, intermeshing gears interconnecting the driving and driven shafts with the rotary shaft for unison rotation, at least one of the said shafts being capable of reciprocatory adjustment relative to the rotary shaft independently of its rotation, and a mount for the rotary carried shaft carried by one of the units wherein the rotary shaft is capable of to and fro teetering motion in addition to its rotary motion.

7. A power transmission assembly for transmitting motion from a driving mechanism on a tractor unit to a driven mechanism on a trailer unit flexibly connected with the trailer for relative adjustment to various unaligned relations incident to deviations from an aligned path of travel and right and left turns over uneven terrain, including a pair of revoluble shafts flexibly connected respectively with the driving and driven mechanisms, a coupling device therefor comprising two interpivoted members connected for relative rotation about an axis substantially perpendicular to the axes of said revoluble shafts with which at least one of said shafts is connected for telescopic motion, a different shaft of said pair being connected with each member, and a mounting carried by one of the units on which the interpivoted members of the coupling device are pivoted for unison oscillation about an axis transversely of the interpivotal axis of said members and also perpendicular to the axes of said shafts and driving means interconnecting the shafts for unison rotation in various positions of independent and joint oscillation of the members of the coupling device.

8. A flexible power transmission assembly interconnecting driving and driven mechanism carried by flexibly interconnected supporting members, which members are subject to fluctuating degrees of unalignment with each other, including a pair of rotary driving and driven shafts, flexible couplings connecting the respective shafts with the driving and driven mechanisms, a coupling unit in relation with which at least one of the shafts is capable of reciprocatory motion, a pivotal joint connecting portions of the coupling unit with which the respective shafts connect for independent rotative adjustment, a support carried by one of the members upon which the coupling unit is pivotally mounted and about which pivotal axis the relatively rotatable portions of the coupling unit are capable of conjoint tilting motion, and driving connections between the shafts transmitting unison rotation from one to the other in different positions of adjustment of the respective portions of the coupling unit about the said axes.

9. A power transmission assembly flexibly interconnecting driving and driven mechanisms carried by flexibly interconnected supporting members, which members are subject to fluctuating degrees of unalignment in undetermined directions of one of said members relative to the other, including driving and driven rotary shafts flexibly connected with the respective driving and driven mechanisms, an intermediate coupling unit interconnecting the shafts for oscillatory motion of one of said shafts relative to the other in parallel planes, and a mount for the coupling unit carried by one of said members enabling unison rocking motion of the shafts in a plane transversely of the aforementioned planes of oscillation.

10. A power transmission assembly flexibly interconnecting driving and driven mechanisms carried by flexibly interconnected supporting members, which members are subject to fluctuating degrees of unalignment in undetermined directions, including driving and driven rotary shafts flexibly interconnected with the respective driving and driven mechanisms, a coupling unit including a gear train interconnecting the driving and driven shafts for unison rotation in varying positions of wobble movement, at least one of the shafts being longitudinally extensible and contractible relative to the coupling unit, and a pivotal mounting for the coupling unit carried by one of said members, the construction and arrangement being such that the shafts are capable of relative oscillation one independently of the other in a given plane and are capable of unison oscillation in a plane transversely of that before mentioned.

11. A power transmission assembly flexibly interconnecting driving and driven mechanisms carried by flexibly interconnected supporting members, which members are subject to fluctuating degrees of unalignment in undetermined directions, including driving and driven rotary shafts flexibly interconnected with the respective driving and driven mechanisms, an intermediate coupling element including two interpivoted relatively rotatable members, each of which is engaged by a different one of said shafts for oscillatory adjustment of one said shaft relative to the other into different angular relations, a pivotal mounting for the coupling unit carried by one of said members about the axis of which mounting the coupling unit and the driving and driven shafts are capable of unison oscillation independently of the relative angular adjustment, and drive means for transmitting rotation of the drive shaft to the driven shaft in different positions of oscillatory adjustment thereof.

12. A power transmission assembly flexibly interconnecting driving and driven mechanisms carried by flexibly interconnected supporting members which members are subject to fluctuating degrees of unalignment in undetermined directions, including driving and driven rotary shafts flexibly interconnected with the respective driving and driven mechanisms, an intermediate coupling unit, a mounting therefor carried by one of said members, parts of which coupling unit separately engaged by the respective shafts are mounted for relative and also unison oscillatory adjustment about transverse axes, thereby affording substantially universal adjustments of at least one of the shafts, and a gear train transmitting rotary motion from the driving shaft to the driven shaft in various positions of relative adjustment thereof.

13. A power transmission assembly flexibly interconnecting driving and driven mechanisms carried by flexibly interconnected supporting members, which members are subject to fluctuating degrees of unalignment in undetermined directions, including driving and driven rotary shafts flexibly interconnected with the respective driving and driven mechanisms, an intermediate coupling unit carried by one of said members including pivotally mounted members capable of independent and unison oscillation about different axes, with the respective member of which the driving and driven shafts are interconnected for rotary motion relative thereto, one of the shafts being extensible and contractible relative to the coupling unit, and power drive means interconnecting the shafts through said coupling unit for simultaneous rotation.

14. In an apparatus wherein tractor and trailing units are capable of relatively unaligned undulating paths of travel both laterally and vertically, a power transmission assembly interconnecting driving and driven mechanisms on the tractor and trailing units, including rotary drive and driven shafts flexibly connected with the driving and driven mechanisms, an intermediate coupling unit comprising interpivoted relatively revoluble parts with which both said shafts engage and relative to which at least one of said shafts is capable of reciprocatory motion, mounting means for the coupling unit carried by one of the units enabling relative oscillation of the respective parts thereof about a given axis and unison oscillation thereof about a different axis to thereby enable adjustment of the shafts to various angular positions necessitated by varying degrees of lateral and vertical unalignment of the driving and driven mechanisms, and motion transmitting means for transmitting rotation of the drive shaft to the driven shaft in various relatively changing positions of unalignment.

15. An apparatus wherein driving and driven mechanisms are carried by flexibly interconnected supporting members, which members are subject to fluctuating degrees of unalignment of one relative to the other, including rotary driving and driven shafts flexibly connected with the corresponding driving and driven mechanisms, an intermediate coupling unit comprising interpivoted relatively revoluble members with which the shafts are interconnected for oscillation of one relative to the other into different positions of angular adjustment, a mounting carried by one of the members on which the interpivoted relatively revoluble members of the coupling unit are pivoted for unison oscillation thereof about an axis perpendicular to that of their interpivotal connection, at least one of the shafts being longitudinally extensible and contractible relative to the coupling unit, and a gear train on said coupling unit interconnecting the driving and driven shafts for simultaneous rotation in various positions of oscillatory adjustment of at least one of the shafts.

16. A flexible power transmission mechanism for operatively interconnecting driving and driven mechanisms carried by flexibly interconnected supporting members, which members are subject to fluctuating degrees of unalignment in undetermined directions, driving and driven revoluble shafts flexibly connected respectively with the driving and driven mechanisms, a geared coupling unit located in relatively spaced relation intermediate the driving and driven mechanisms with which the shafts are connected for relative reciprocatory motion, transmitting rotary motion from the driving to the driven shaft, including a planetary gear element mounted on each of the driving and driven shafts, a sun gear with which each of the planetary gears intermeshes and about the axis of which the planetary gear is adjustable to different radial positions of intermeshing engagement with the sun gear in accordance with oscillatory adjustment of the corresponding shaft, a single inflexible shaft common to the sun gears pertaining to the planetary pinions of the respective shafts, and a mounting carried by one of the members upon which the sun gear shaft is capable of to and fro tilting movement of its axis in accordance with corresponding tilting motion of the shafts and the planetary gears carried thereby, the construction and arrangement being such that the revoluble driving and driven shafts will yield universally with varying unaligned movements of the driving and driven mechanisms while the coupling unit gears will maintain operative interconnection between the shafts in all positions of relative adjustment of the driving and driven mechanisms.

17. An assembly wherein driving and driven mechanisms are mounted on draft and trailer units which are flexibly coupled for unison travel motion in varying relations of unalignment, including a jointed power shaft flexibly connected with the driving and driven mechanisms, a medial support therefor carried by one of the units in spaced relation with the driving and driven mechanisms and automatically movable to and fro in accordance with certain gyrations of the power shaft sections and relative to which at least one of the power shaft sections is capable of reciprocatory motion, and a gear train interconnecting succeeding sections of the flexible power shaft for transmitting rotary motion from one such section to the other in different positions of relative adjustment thereof, including a transverse inflexible shaft section journaled in said support at right angle to the power shaft sections, sun gear pinions on the opposite ends thereof of said transverse shaft, mating gear pinions on the power shaft sections with which gear pinions mesh.

18. An assembly wherein driving and driven mechanisms are mounted on tandem flexibly connected traveling units for unison travel motion in varying degrees of unalignment thereof, including a power transmission mechanism comprising driving and driven shafts flexibly connected with the driving and driven mechanisms, a medial coupling unit therefor mounted on one of the units in intermediate spaced relation with the respective units for oscillatory motion in accordance with certain of the gyrations of the said shafts comprising two interpivoted relatively revoluble portions, both of which are capable of unison oscillation about an intermediate axis in addition to their relative revoluble adjustment and relative to which at least one of the shafts is capable of reciprocatory adjustment, and of wobble motion in various positions of axial adjustment, and a gear train forming a part of the coupling unit transmitting rotary motion from the driving to the driven shafts in various portions of relative adjustment thereof.

19. In a power transmission apparatus, having a pair of revoluble shafts, a coupling unit therefor including two relatively rotatable mounting members with which the shafts are separately connected, a gear on each shaft, a gear member intermeshing therewith revolubly mounted concentrically with each of the rotatable mounting members, a single inflexible shaft interconnecting the gears concentric with the respective mounting members and transmitting rotary motion from the gear on one shaft to that on the other shaft, one of the shafts being capable of longitudinal reciprocatory adjustment independently of the other, the construction and arrangement being such that at least one of the shaft sections is capable of wobble motion while maintaining direct driving connection with the other in various positions of adjustment thereof.

20. An assembly of draft and trailer units carrying driving and driven mechanisms flexibly coupled for unison travel motion in varying relation of unalignment and a power transmission mechanism for transmitting power from the driving to the driven mechanism, including a pair of power shafts capable of independent reciprocatory adjustment and relative oscillatory motion of one relative to the other to various angular positions, and a coupling unit comprising two interpivoted relatively revoluble members mounted on one of the units for unison to and fro tilting motion about an axis angularly disposed to their interpivotal axis, a planetary gear train forming a part thereof comprising a driving gear on one shaft and a driven gear on the other shaft, and a sun gear transmitting rotary motion from the driving to the driven gear in variable positions of angular adjustment of the shafts.

WILHELM VUTZ.

REFERENCES CITED

The following references are of record in the file of this patent:

UNITED STATES PATENTS

| Number | Name | Date |
|---|---|---|
| 1,889,600 | Hansen | Nov. 29, 1932 |
| 1,322,335 | Petersen | Nov. 18, 1919 |
| 1,443,548 | Ray | Jan. 30, 1923 |
| 1,749,274 | Crisler | Mar. 4, 1930 |
| 1,051,619 | Mustin | Jan. 28, 1913 |
| 2,050,497 | McCollum | Aug. 11, 1936 |
| 1,906,606 | Hyman | May 2, 1933 |

Certificate of Correction

Patent No. 2,421,044.                                                                                      May 27, 1947.

WILHELM VUTZ

It is hereby certified that error appears in the printed specification of the above numbered patent requiring correction as follows: Column 8, line 29, claim 6, after the word "rotary" strike out *carried*; and that the said Letters Patent should be read with this correction therein that the same may conform to the record of the case in the Patent Office.

Signed and sealed this 29th day of July, A. D. 1947.

[SEAL]

LESLIE FRAZER,
*First Assistant Commissioner of Patents.*